United States Patent [19]

Nakos

[11] Patent Number: 5,063,254

[45] Date of Patent: Nov. 5, 1991

[54] MTQ/POLYSILOXANE HYBRID RESINS, METHOD OF MAKING THE SAME, AND COATING/POTTING COMPOSITIONS CONTAINING THE SAME

[75] Inventor: Steven T. Nakos, Andover, Conn.

[73] Assignee: Loctite Corporation, Hartford, Conn.

[21] Appl. No.: 441,508

[22] Filed: Nov. 27, 1989

Related U.S. Application Data

[63] Continuation-in-part of Ser. No. 176,892, Apr. 4, 1988, abandoned.

[51] Int. Cl.$^5$ .................. C08C 77/38; C08C 77/20
[52] U.S. Cl. ............................ 522/43; 522/99; 522/148; 525/477; 528/32; 427/341; 427/387; 428/447
[58] Field of Search ............ 528/26, 32; 525/477; 522/99, 47; 428/447; 427/387, 54.1

[56] References Cited

U.S. PATENT DOCUMENTS

| | | | |
|---|---|---|---|
| 2,486,162 | 10/1949 | Hyde | 260/46.5 |
| 3,782,940 | 9/1972 | Ohto et al. | 96/36 |
| 3,865,588 | 2/1975 | Ohto et al. | 96/33 |
| 4,267,298 | 5/1981 | Bluestein | 528/34 |
| 4,293,671 | 10/1981 | Sasaki et al. | 525/478 |
| 4,503,208 | 3/1984 | Lien et al. | 528/15 |
| 4,504,629 | 3/1985 | Lien et al. | 525/288 |
| 4,529,629 | 7/1985 | Liu | 427/387 |
| 4,575,545 | 3/1986 | Nakos | 526/245 |
| 4,575,546 | 3/1986 | Klemarczyk | 526/145 |
| 4,585,670 | 4/1986 | Liu | 427/54.1 |
| 4,625,007 | 11/1986 | Ellis et al. | 526/279 |
| 4,699,802 | 10/1987 | Makos et al. | 427/54.1 |
| 4,728,709 | 3/1988 | Klemarczyk | 528/15 |

FOREIGN PATENT DOCUMENTS 8600322  1/1986  World Int. Prop. O. .

Primary Examiner—John C. Bleutge
Assistant Examiner—R. Dean, Jr.
Attorney, Agent, or Firm—Steven & Hultquist

[57] ABSTRACT

A polysiloxane comprising a linear polydiorganosiloxane chain joined at one terminus to an acrylic-functional end group, and joined at its other end to a cross-linked MTQ moiety comprising a multiplicity of monofunctional siloxane units (M), trifunctional siloxane units (T), and tetrafunctional siloxane units (Q), wherein the concentration ratio of M units to the sum of T units and Q units, $M/(T+Q)$, in the MTQ moiety is from about 0.55 to about 0.75, and wherein the number of siloxy repeating units in the linear polydiorganosiloxane chain is from 25 to 1,000. The M and or /T units may also contain (meth)acrylate groups. The MTQ/silicone hybrid resins of the invention are curable by UV radiation, to provide high tensile strength silicone compositions having utility in potting and conformal coating aplications.

27 Claims, No Drawings

MTQ/POLYSILOXANE HYBRID RESINS, METHOD OF MAKING THE SAME, AND COATING/POTTING COMPOSITIONS CONTAINING THE SAME

CROSS-REFERENCE TO RELATED APPLICATION

This is a continuation-in-part of U.S. application No. 07/176,892 filed Apr. 4, 1988, now abandoned.

BACKGROUND OF THE INVENTION

1. Field of the Invention

This invention relates generally to curable silicone resins comprising linear diorganosiloxane polymer chains, and to compositions comprising curable silicones useful in conformal coating and potting applications, particularly those in which self-leveling behavior of the composition is required.

2. Description Of The Related Art

For ease of reference in the ensuing description, the following definitions are applicable to siloxane functional groups as described herein.

As used hereinafter, "M" refers to a monofunctional siloxane unit of the formula:

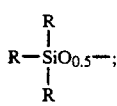

"D" refers to a difunctional siloxane unit of the formula:

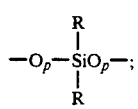

"T" refers to a trifunctional siloxane unit of the formula:

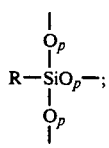

and "Q" is a tetrafunctional siloxane unit of the formula

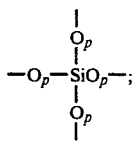

wherein p has a value of 0.5 when the associated oxygen atom is bonded to another silicon atom, and a value of 1 when the associated oxygen atom is bonded to other than a silicon atom, with the proviso that at least one p in each D, T, and Q unit has a value of 0.5.

MQ hydrolyzates and related compounds have been known since the early 1950's and may be prepared by the condensation of sodium silicate and triorganohalosilanes. Such MQ resins with surface trimethylsilyl silane groups are disclosed in U.S. Pat. No. 2,676,182 of W. Daudt, et al, and are usefully employed in pressure-sensitive adhesives. The Daudt et al. patent also discloses MQ resins with other surface groups, such as phenyl and methoxyl.

Later, the hydrolysis of tetraethyl orthosilicate and triorganochlorosilanes was optimized to prepare vinyl MQ resins, of the type disclosed in Nelson U.S. Pat. No. 3,284,406.

U.S. Pat. No. 4,041,010 to E. Jeram describes preparation of MDQ resins by a similar tetraethyl orthosilicate-based synthesis procedure, the resulting MDQ resins containing vinyl groups capable of platinum-catalyzed addition cure with SiH oligomers. Such resins have utility in two-part addition cure RTV silicone compositions.

Tolentino U.S. Pat. No. 4,568,566 discloses an acrylic-functional silicone resin which is curable by either ultraviolet radiation or heating in the presence of a free-radical initiator catalyst. The patent discloses that these resins may be employed in compositions for conformal coatings and in coatings for optical fibers. The silicone resin composition is described at column 4, lines 7–37 of the patent, and comprises 75–100 mole percent of chemically combined M, T, and Q siloxy units and 0–25 mole percent D units. The patent states that the disclosed silicone resins preferably are substantially free of D units and thus consist primarily of M, T, and Q units or mixtures thereof. At column 6, lines 45–56 of this reference, it is disclosed that the comparative number of M, Q, and T units can vary as necessary to obtain desired properties. For MQ resins, the patent discloses a preferred ratio of M units to Q units from about 1:1 to about 3:1. MT resins preferably employ a ratio of M units to T units of from about 0.5:1 to about 2:1. MTQ resins are disclosed as having a ratio of M units to T units from about 0.5:1 to about 2:1, and a ratio of M units to Q units of from about 0.5:1 to about 3:1.

Self-leveling silicones, i.e., formulations comprising polysiloxanes which flow into or onto a part and form level pools of the resinous material, are widely used in a number of conformal coating and potting applications.

UV curable self-leveling silicone compositions, based on methacryl-terminated liquid silicones and containing fumed silica filler, are known. Such compositions, while highly useful in conformal coating and potting applications, suffer the deficiency that only low levels of fumed silica filler, e.g., on the order of about 5 percent or less by weight, may be employed. Accordingly, the cured properties of such silica-filled compositions may for example be on the order of the following: tensile shear strength, 100 psi; elongation, 85 percent; tear strength, 8 pli; and Shore A hardness, 31. These illustrative values are based on a methacryl-terminated liquid silicone having about 5 percent of fumed silica filler therein, with an uncured viscosity in the range of about 4500–6500 centipoise.

While the fumed silica filler is efficacious in improving the cured properties of the above described composition containing same, beyond that achievable in the absence of such filler, the use of silica in amounts above about 5 percent by weight (based on the weight of the silicone material), while improving the physical properties of the cured composition, also converts it into a non-flowable grease. Such non-flowable character renders the filled silicone useless for its intended application as a flowable, self-leveling coating or potting material.

The foregoing limitation on filler content is particularly disadvantageous for potting applications which require a flowable material whose cured properties (tensile shear strength, elongation, tear strength, Shore A hardness) substantially exceed the values set forth above for the illustrative silica-filled silicone composition. Examples of such potting applications include potting of electrical and/or mechanical components in housings, such as solenoids, variable resistors, capacitors, etc.

It therefore would be a significant advance in the art to provide a silicone resin composition for conformal coating and potting applications, which provides superior cured properties for tensile shear strength, elongation, tear strength and Shore A hardness, but which does not have a viscosity so high as to preclude flowability and self-leveling behavior of the composition.

Accordingly, it is an object of the present invention to provide a silicone resin composition providing good flow and self-leveling behavior in conformal coating and potting applications, with superior physical properties for the cured composition.

Other objects and advantages of the invention will be more fully apparent from the ensuing disclosure and appended claims.

SUMMARY OF THE INVENTION

The present invention relates broadly to a polysiloxane, comprising:

(I) a multifunctional cross-linked MTQ moiety having a plurality of pendant hydroxy groups and comprising a multiplicity of monofunctional siloxane units (M),

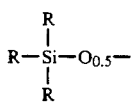

trifunctional siloxane units (T),

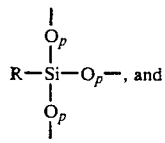

tetrafunctional siloxane units (Q),

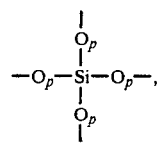

wherein:

p has a value of 0.5 when the associated oxygen atom is bonded to another silicon atom, and a value of 1 when the associated oxygen atom is bonded to other than a silicon atom, with the proviso that at least one p in each T and Q unit has a value of 0.5;

each R is independently selected from the group consisting of alkyl, aryl, alkaryl, aralkyl, haloalkyl, (meth)acryloxyalkyl, and (meth)acryloxyalkenyl;

the concentration ratio of M units to the sum of T and Q units, $M/(T+Q)$, in the cross-linked MTQ moiety is from about 0.55 to about 0.75; and (II) covalently bonded to the cross-linked MTQ moiety a diorganosiloxane polymer of the formula:

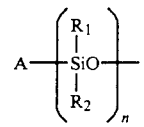

wherein:

A is an acrylic-functional end group;

$R_1$ and $R_2$ are each independently selected from the group consisting of alkyl, aryl, alkaryl, aralkyl, haloalkyl, (meth)acryloxyalkyl, and (meth)acryloxyalkenyl; and n is from 25 to 1000.

A further aspect of the invention relates to a polysiloxane of the type described above, comprising silanol groups in sufficient quantity relative to the number of acrylic functional groups present, to maintain a self-leveling liquid that is curable by exposure to UV radiation in the presence of a suitable photoinitiator.

Still another aspect of the invention relates to a polysiloxane of the formula set out above, wherein A is (alkyl)acryloxyalkyl or (alkyl)acryloxyalkenyl, e.g., wherein A is selected from the group consisting of:

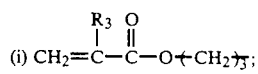

and (ii) (alkyl)acryloxyalkenyl selected from the group consisting of:

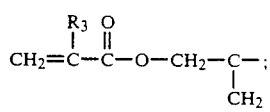

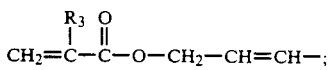

and isomeric mixtures thereof;

wherein $R_3$ is H or alkyl.

Preferably, the MTQ moiety of the above-described polysiloxane contains no D siloxane units.

The invention relates in another aspect to a graft MTQ/silicone resin formed by reacting (i) a cross-linked MTQ moiety having a first reactive functional group, with (ii) a linear diorganosiloxane polymer having (A) from 25 to 1,000 diorganosiloxy repeating units and (B) a second reactive terminal functional group, which is reactive with the first reactive functional group to covalently bond the diorganosiloxane polymer to the cross-linked MTQ moiety.

In a further aspect, the present invention relates to a method of making an MTQ/silicone hybrid resin, comprising the steps of:

(a) forming a linear polydiorganosiloxane having acrylic and chloro end groups, and comprising from 25 to 1,000 diorganosiloxy repeating units;

(b) hydrolyzing tetraalkyl orthosilicate, an acrylic-functional trialkoxysiloxane, and a chlorotrialkylsilane, to form an MTQ resin comprising silanol functionality; and (c) reacting said linear polydiorganosiloxane with said MTQ resin, to form an MTQ/silicone hybrid resin.

Still other aspects of the invention relate to: a process of potting or conformally coating a substrate element with a composition including a polysiloxane (MTQ/silicone resin) according to the invention, in combination with a UV photoinitiator; and the potted or conformally coated articles produced thereby.

Other aspects and features of the invention will be more fully apparent from the ensuing disclosure and appended claims.

DETAILED DESCRIPTION OF THE INVENTION, AND PREFERRED EMBODIMENTS THEREOF

MTQ/polysiloxane hybrid resins of the present invention are of the general formula:

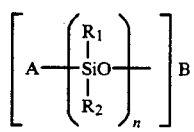

wherein

A is an acrylic-functional end group;

$R_1$ and $R_2$ are each independently selected from alkyl, aryl, alkaryl, aralkyl, haloalkyl, (meth)acryloxyalkyl, and (meth)acryloxyalkenyl;

B is a multifunctional cross-linked MTQ moiety having a plurality of pendant hydroxy groups, and comprising a multiplicity of monofunctional siloxane units (M),

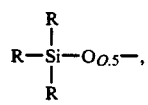

trifunctional siloxane units (T),

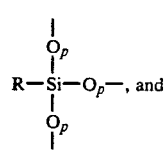

tetrafunctional siloxane units (Q),

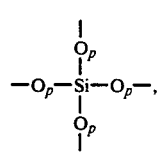

wherein:

p has a value of 0.5 when the associated oxygen atom is bonded to another silicon atom, and a value of 1 when the associated oxygen atom is bonded to other than a silicon atom, with the proviso that at least one p in each T and Q unit has a value of 0.5;

each R is independently selected from alkyl, aryl, alkaryl, aralkyl, haloalkyl, (meth)acryloxalkyl, and (meth)-acryloxyalkenyl;

the molar concentration ratio of M units to the sum of T and Q units, M/(T+Q), in the cross-linked MTQ moiety is from about 0.55 to about 0.75; and n is 25 to 1000.

Preferably, the molar concentration ratio M/(T+Q) is from about 0.60 to about 0.70, and most preferably, such ratio is substantially about 0.67. The MTQ moiety of the polysiloxane hybrid resin of the invention preferably contains no difunctional siloxane (D) units. The number of such diorganosiloxy repeating units, n, may broadly range from 25 to 1,000, and preferably is from 100 to 1,000. These ranges of the number of repeating units have been found to yield a hybrid polysiloxane resin having good physical properties and which is self-leveling in character prior to curing of the resin. Accordingly, long polydiorganosiloxane chains are employed, of at least 25 repeating units, and preferably at least 100 repeating units, to provide a flowable, self-leveling polysiloxane composition which subsequent to curing retains good flexibility characteristics due to the long chain constituents thereof.

In contrast to the teachings of the previously described Tolentino patent, U.S. No. 4,568,566, wherein M, T, and Q, components are co-reacted to form the corresponding MTQ resin (or MDTQ resin, if a D silane reactant is optionally employed), the MTQ/silicone hybrid resins of the present invention are formed by reacting a linear diorganosiloxane (silicone) polymer with a previously formed MTQ moiety, wherein the MTQ moiety preferably contains no D units. The polysiloxane of the present invention thus is a grafted hybrid resin formed by reactive joining (covalent bonding) of constituent MTQ and linear silicone polymer components. As will be more fully shown in comparative examples hereinafter, such grafting of the long-chain silicone polymer to the cross-linked MTQ moiety produces a curable hybrid resin product which is wholly different from, and non-analogous to, the non-hybrid resin compositions of Tolentino.

The acrylic-functional MTQ/silicone hybrid resins of the present invention thus provide an ultraviolet (UV) radiation curable silicone composition which is comprised of linear polydiorganosiloxane chains bonded to an MTQ moiety.

The MTQ portion of the MTQ/polysiloxane hybrid resin may for example comprise silicate units, (meth)acrylate-containing trifunctional siloxane units, and trialkylsiloxane units, forming a cross-linked MTQ/polysiloxane resin having pendant hydroxy and (meth)acrylic functionality. The linear polydiorganosiloxane chain portions of the MTQ/polysiloxane hybrid resin are generally of the formula:

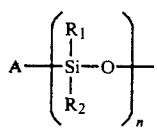

wherein n is 25 to 1,000, and the organic substituents $R_1$ and $R_2$ of the silicon atoms in the linear polydiorganosiloxane chains may independently be selected from alkyl, aryl, alkaryl, aralkyl, haloalkyl, (meth)acryloxyalkyl, and (meth)acryloxyalkenyl substitutents. Preferably these substitutents are alkyl radicals, and most preferably methyl. The A substituent is an acrylic functional end group, such as for example (meth)acryloxyalkyl or (meth)acryloxyalkenyl.

The MTQ/silicone hybrid resins of the present invention, which may suitably be formed by reacting (1) a linear silicone polymer with (2) the reaction product of an M silane (e.g., chlorotrimethylsilane), a T silane (e.g., methacryloxypropyltrimethoxysilane) and a Q silane (e.g., tetraethyl orthosilicate), have utility as reinforced silicone rubber precursors, which as a result of their acrylic functionality cure readily by UV radiation, in the presence of a suitable photoinitiator. These hybrid resins may be usefully employed in potting/conformal coatings applications requiring a self-leveling silicone composition, and do not require the addition of any further polydiorganosiloxanes or any other silicone materials thereto in order to achieve utility in such applications.

As indicated above, the MTQ/silicone hybrid resins of the invention are capable of ultraviolet radiation cure when mixed with a suitable photoinitiator. For example, the hybrid polysiloxane resin may be UV cured with a photoinitiator such as alpha, alpha - diethoxyacetophenone.

The MTQ/silicone hybrid resins of the invention, when cured, possess bulk physical properties which are significantly better than the corresponding unmodified linear silicones, and which approach the properties attainable using particulate silica as a filler in the corresponding unmodified linear silicones.

Further, the MTQ moiety of the MTQ/silicone hybrid resin provides reinforcement of the resin without undue viscosity build-up, such as results from the use of silica fillers in previously employed linear silicone formulations. As described hereinearlier, the use of silica in any appreciable quantity significantly increases the viscosity of the linear silicone and transforms it into a grease-like material which is not flowable or self-leveling in character.

The typical viscosities of MTQ/linear silicone resins of the present invention may range from about 10,000 to about 200,000 centipoise, and preferably from about 15,000 to about 70,000 centipose.

The resins of the present invention consist of two basic portions. The linear silicone portion contains an acrylic functional end group, e.g., an acrylate or methacrylate group, bonded to one end of a linear polysiloxane Preferred acrylic functional end groups include (alkyl)acryloxyalkyl and (alkyl)-acryloxyalkenyl groups, such as those selected from the class consisting of:

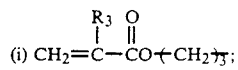

and (ii) (alkyl)acryloxyalkenyl selected from the class consisting of:

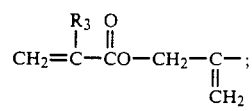

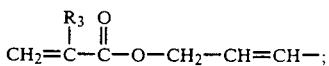

and isomeric mixtures thereof;
wherein
$R_3$ may be H or alkyl.

As used herein, "(alkyl)acryloxyalkyl" is intended to include alkylacryloxyalkyl as well as acryloxyalkyl groups; "(alkyl)acryloxyalkenyl" is intended to include alkylacryloxyalkenyl as well as acryloxyalkenyl; and "(meth)acrylate" is intended to include methacrylates as well as acrylates.

The MTQ portion of the hybrid MTQ/silicone resin of the invention may for example be formed as a hydrolysate of tetraethyl orthosilicate, methacryloxypropyltrimethoxysilane and chlorotrimethylsilane. Its molecular weight may range from 1000 to 10,000 grams per mole. The mole ratio of M(monofunctional) units to the sum of T(trifunctional) units and Q(tetrafunctional) units for this illustrative MTQ moiety may suitably range from about 0.55 to about 0.75, and preferably from about 0.60 to about 0.70. The methacrylate concentration may range from 2–25 mole% (0.28 meq/gm-2.54 meq/gm) and preferably from 4.4–11.5 mole% (0.60 meq./gm-1.4 meq./gm). Acryloxypropenyltrimethoxysilane may be used in place of methacryloxypropyltrimethoxysilane.

Other formulation components, such as fillers, adhesion promotors, non-reactive diluents, reactive diluents such as di(meth)acrylate-terminated silicones, antioxidants, and stabilizers may be utilized as desired with such MTQ/silicone hybrid resins.

The MTQ resin portion of the hybrid resin, as indicated, may be formed by hydrolysis of tetraethyl orthosilicate (TEOS), methacryloxypropyltrimethoxysilane, and chlorotrimethylsilane, and this hydrolysis may suitably be carried out in an aqueous solvent medium at a temperature on the order of about 70° C. The aqueous solvent medium may for example be a mixture of water and toluene.

The resulting MTQ resin product has a plurality of silanol functional groups. The concentration of such groups may for example be on the order of from about 0.8 to about 1.0 meq SiOH/gram of the resin product.

The linear silicone portion of the MTQ/silicone hybrid resin may be synthesized using as a starting material a hydroxy-terminated linear polydiorganosiloxane. A particularly suitable material of such type is RP48V3500 silicone fluid, having a molecular weight of about 28,000, and commercially available from Rhone-Poulenc S.A., Lyon, France. The polydiorganosiloxane constituent preferably has a molecular weight in the range of 20,000 to about 40,000, when the organo substituents of the siloxy repeating units are lower alkyl, e.g., methyl.

The linear silicone starting material may then be reacted with a suitable chlorosilyl acrylate compound, e.g., acryloxypropenyldimethylchlorosilane, in the presence of a tertiary amine, such as triethylamine containing 1 percent by weight, based on the weight of the solution, of 4-dimethylaminopyridine (DMAP), to yield the corresponding monoacrylated linear silicone. The silicone monoacrylate then may be reacted with an excess of dimethyldichlorosilane in the presence of the DMAP-containing triethylamine solution to form the corresponding acrylated linear silicone having a chlorosilane end group functionality. This chlorinated linear silicone may then be reacted with the MTQ resin, formed as previously described, to yield the MTQ/silicone hybrid resin of the invention. The reaction of the MTQ resin with the linear silicone may be carried out to react a substantial major portion, e.g., 95%, of the TQ hydroxyl groups in the MTQ resin, thereby joining the polydiorganosiloxane chains with the terminal oxo groups derived from the hydroxyl functionalities of the T and Q units in the precursor MTQ resins.

The resulting MTQ/silicone hybrid resin comprises silanol groups in sufficient quantity relative to the number of acrylic functional groups present to render the hybrid resin self-curable by exposure to UV radiation in the presence of a suitable photoinitiator.

The product MTQ/silicone hybrid resin may thus be employed for conformal coating and potting applications, in admixture with a suitable photoinitiator such as alpha, alpha-diethylacetophenone (DEAP).

The ultraviolet radiation curing conditions may be varied widely, depending on the depth of the resin film and the specific composition of the MTQ/silicone hybrid resin, as will be appreciated by those skilled in the art. By way of specific example, an MTQ/silicone hybrid resin of the above-described type, wherein the linear silicone moiety is a linear polydimethysiloxane, and the hybrid resin has a viscosity on the order of about 30,000 centipoise, may be cured at depths of resin on the order of 70 mils, by exposure to UV radiation from a 254 nm high pressure mercury lamp having an intensity of 70 milliwatts per square centimeter, for about 60 seconds.

The MTQ/silicone hybrid resins of the invention exhibit greatly improved tensile shear strength, tear strength, and Shore A hardness over corresponding (meth)acrylate-terminated linear silicones. Typical MTQ/silicone hybrid resins of the invention may exhibit cured properties of tensile shear strength approaching 500 psi, tear strength of 30-35 pli, Shore A hardness in the vicinity of 50, and elongation on the order of 150%.

The features of the present invention are more fully shown with respect to the following non-limiting examples, wherein all parts and percentages are by weight, unless otherwise expressly stated.

In the ensuing examples, all reagents were used directly unless otherwise specified. Viscosities were measured on a Brookfield RVT viscometer with an RV5 spindle. Percent hexane extractables were performed on weighed cured films by Sohxlet refluxing for 24 hours, then drying at 60° C. and 1 mm pressure for 5 hours and reweighing. Percent solids of the MTQ solutions were found by drying a known weight of solution at 130° C. and 1 mm pressure for 1 hour, and then reweighing.

EXAMPLE I

Preparation of MTQ Resin

The base MTQ resin was prepared by reaction of trimethylchlorosilane, tetraethyl orthosilicate, and methacryloxypropyltrimethoxysilane, according to the reaction scheme described below.

Into a three liter, 4-necked Morton Flask fitted with condenser, thermometer, mechanical stirrer, and constant pressure addition funnel were added 520.82 g (2.50 moles) tetraethyl orthosilicate, 147.80 g (0.595 mole) methacryloxypropyltrimethoxysilane, 225.55 g (2.075 moles) chlorotrimethylsilane and 290 ml toluene. Water (deionized, 400 ml, 22.2 moles) was added dropwise, allowing the temperature of the rapidly stirred mixture to rise to 60° C. This temperature was maintained with external cooling. The reaction mixture was stirred 2 hours at 70° C. after the addition. Water (400 ml) was added to the stirred mixture, which then was allowed to phase. The lower product layer was separated and subjected to distillation, removing about 250 ml distillates (water, methanol, ethanol, and toluene) and periodically replacing lost volume with toluene in 50 ml increments during the course of the distillation. The distillation was terminated when the overhead temperature reached 105° C. The crude product solution was stirred about 10 minutes with 50 g of 20% Fullers earth in Celite 545 and filtered over a Celite 545 bed. The combined filtrates were stripped briefly on a rotary evaporator, removing about 50 ml toluene, giving 602.2 g of a light yellow, mobile solution containing 66.5% solids.

The ratio M/(T+Q) for the product resin was 0.67, and this resin contained 11.5 mole % methacrylate, 0.66 meq total OH/gm solution, 0.942 meq SiOH/g solid, and 308 ppm $H_2O$.

EXAMPLE II

Preparation of MTQ/Silicone Hybrid Resin

Into 300 ml 3-necked flask equipped with mechanical stirrer, thermometer, and nitrogen blanket were placed 80.0 g ($7.42 \times 10^{-3}$ eq total OH) RP48V3500 silicone fluid (Rhone-Poulenc S.A.), 1.50 g (0.014 g eq amine) of a solution of 1% 4-dimethylaminopyridine (DMAP) in triethylamine, and 0.76 g ($3.71 \times 10^{-3}$ mole) of acryloxypropenyldimethylchlorosilane. The contents were heated to 70° C. under a nitrogen blanket with stirring to form the monoacrylate intermediate. After one hour at 70° C., 2.95 g (0.0229 mole) dichlorodimethylsilane were added, with continued stirring thereafter for one additional hour at 70° C. Added in succession were 63.75 g (69.8% solids, 0.918 meq SiOH/g solid, and 484 ppm water) MTQ resin, prepared in accordance with the procedure of Example I, and 4.00 g (0.0396 mole as triethylamine) of the above-described 4-DMAP/triethylamine solution. When the addition was complete, the reaction mixture was aged for three hours at 70° C. Methanol (7 g) was added, stirring for 10 minutes at 70° C. The reaction mixture was stripped on a rotary evaporator for one hour at 70° C. and 0.5 mm. After redilution with an equal volume of hexane, salts were removed by filtration through a Celite 545 bed. The filtrate was stripped as before, giving 110 g of a cloudy liquid. The product, having a viscosity of 29,400 cps (RV5 Brookfield, 5 rpm), was mixed with 2.24 g of alpha, alpha-diethoxyacetophenone (DEAP), to produce a UV-curable composition.

EXAMPLE III

UV Curing of MTQ/Silicone Hybrid Resin

The MTQ/silicone hybrid resin product of Example II containing 2% DEAP was cast between polyethylene-backed 6" square glass plates with a 70 mil by 6" square outer dimension by 5½" square inner dimension Teflon ® spacer. The clamped assembly was placed in a Technocure ® high pressure mercury vapor lamp UV curing chamber and irradiated 60 seconds per specimen side at an intensity of 70 milliwatts per square centimeter. After cooling, the cured specimen was peeled free of the plates and cut into tensile and tear test specimens according to ASTM method D412. For comparison, a corresponding unfilled diacrylate-terminated silicone containing 2% DEAP was prepared and was similarly UV radiation cured. The following bulk properties were obtained for the respective specimens:

| Cured MTQ/Silicone Hybrid Resin | Cured Diacrylate Silicone |
|---|---|
| Tensile: 490 psi | 30 psi |
| Elongation: 106% | 150% |
| Tear: 34 pli | 5 pli |
| Shore A: 54 | <5 |

The MTQ/silicone hybrid resin thus exhibited greatly improved tensile, tear, and Shore A properties over the unfilled diacrylate-terminated silicone.

EXAMPLE IV

In this example, a statistical approach was utilized to optimize MTQ/silicone hybrid resins of the present invention.

The MTQ/silicone hybrid resin synthesis procedure entails a large number of component variables. Parameters such as M:Q ratio, percent capping of linear silanol with acrylate-functional groups, and percent reaction of MTQ OH functional groups are typical examples, and strongly influence synthesis capability. Efforts were therefore focused on two parameters that were amenable to variation: percent MTQ solids and MTQ acrylate/methacrylate concentration.

The following property trends were anticipated: (i) reinforcement should be minimal with low solids and/or low acrylic concentration, giving low tensile shear strength, tear strength and Shore A hardness with high elongation; (ii) a high acrylic level may lead to over-crosslinking, evidenced by low elongation and tear strength; and (iii) high MTQ solids may give good cured properties, but could cause high uncured viscosity.

Based on the above, a seven point 2p factorial study was carried out, varying MTQ solids from 20% to 50%. The acrylic functionality concentration of the MTQ base resin was varied from 4.4 mole % methacrylate to 11.5 mole % methacrylate (0.60 meq/g to 1.40 meq/g). Seven MTQ/silicone hybrid resins (Samples 1-7) were then prepared according to the reaction scheme of Example II, adjusting reagents as required for the type and amount of MTQ resin, generally following the synthesis procedure set forth in Example II. Each hybrid resin, containing DEAP (2%) was UV cured as previously described, and then analyzed for bulk properties, the values of which are set out in Table I below.

TABLE I

| Sample | Tensile (psi) | Elongation (%) | Tear (pli) | Shore A |
|---|---|---|---|---|
| 1 | 108 | 161 | 10 | 20 |
| 2 | 615 | 115 | 77 | 65 |
| 3 | 308 | 136 | 14 | 36 |
| 4 | 575 | 39 | 48 | 73 |
| 5 | 514 | 124 | 34 | 47 |
| 6 | 535 | 155 | 26 | 44 |
| 7 | 483 | 112 | 30 | 50 |

The weight percent solids of the MTQ moiety in the hybrid resin ("MTQ % solids"), the concentration of methacrylate functionality on the MTQ moiety of the resin ("[MA] on MTQ"), and the total acrylic and methacrylic functionality in the hybrid resin ("Total Acr") are set out below in Table II.

TABLE II

| Sample | MTQ % Solids | [MA] on MTQ meq/g | Total Acr, meq/g |
|---|---|---|---|
| 1 | 20 | 0.60 | 0.16 |
| 2 | 50 | 0.60 | 0.32 |
| 3 | 20 | 1.40 | 0.32 |
| 4 | 50 | 1.40 | 0.72 |
| 5 | 35 | 1.00 | 0.38 |
| 6 | 35 | 1.00 | 0.38 |
| 7 | 35 | 1.00 | 0.38 |

Based on a 2p factorial data analysis, the following physical property equations were derived:

Tensile (psi) = $-500 + 22.9y1 + 450y2 - 10y1y2$
Elongation (%) = $184.8 - 0.3y1 + 11.5y2 - 2.1y1y2$
Tear (pli) = $-53.8 + 3.1y1 + 32.3y2 - 1.4y1y2$
Shore A = $-26 + 1.7y1 + 26.7y2 - 0.33y1y2$ By inserting % solids for y1 and acrylic concentration of the MTQ for y2, these properties may be predicted. Also, simultaneous solutions are possible, allowing calculation of y1 and y2 for an expected set of properties. One may then run the experiment based on calculated y1 and y2 values, obtain bulk properties, and check their values against the expected results.

The data in Table I showed that both higher solids and higher acrylic levels increased tensile shear strength and Shore A hardness and decreased elongation, as predicted. Tear strength benefitted mostly from higher solids. Higher order (y1, y2) interactions were significant contributors in all cases. The tensile shear strength, tear strength, and Shore A hardness data plots indicated slight curvature (non-linearity) near the center while elongation appeared linear throughout its array.

Uncured viscosities of the hybrid resins were also very high in this example. All samples except the high methacrylate level Samples 3 and 4 were clear, but near gels of very high viscosity. Samples 3 and 4 were slightly cloudy and had viscosities of 43,500 cps and 136,000 cps, respectively.

Based on the data generated in this example, it was concluded that 35% solids levels give good reinforcement without objectionable viscosity or incompatibility, and that MTQ hybrid resins with total (meth)acrylic concentrations above 0.38 meq/gm yield hybrid resins with a particularly high reinforcement character.

EXAMPLE V

In this example, MTQ/silicone hybrid resin samples (Samples 8-10) having the solids levels, MTQ moiety methacrylate functionality concentrations, and total hybrid resin (meth)acrylic functionality set out in Table III below were prepared by the procedure of Example II.

TABLE III

| Sample | % MTQ Solids | [MA] on MTQ, meq/g | Total Acr, meq/g |
|---|---|---|---|
| 8 | 35 | 1.00 | 0.38 |
| 9 | 35 | 1.20 | 0.45 |
| 10 | 35 | 1.40 | 0.52 |

To optimize viscosities, 5 weight percent methanol was added to the hybrid resin after MTQ coupling, followed by heating of the hybrid resin for one hour at 70° C. before filtering of the product hybrid resin. The product hybrid resin was mixed with DEAP (2%) and UV cured as previously described.

The bulk physical properties of the cured resins were then determined, as listed in Table IV below.

TABLE IV

| Property | Sample 8 | Sample 9 | Sample 10 |
|---|---|---|---|
| Tensile (psi) | 410 | 518 | 611 |
| Elongation (%) | 131 | 154 | 115 |
| Tear (pli) | 22 | 30 | 34 |
| Shore A | 42 | 42 | 58 |
| Uncured Viscosity (cps) | 46,000 | 25,000 | 29,400 |
| Hydrolyzable Chloride (ppm) | 3 | 3 | 1 |
| % Hexane Extractables | 7.6 | 6.8 | 5.1 |
| Appearance | Hazy | Cloudy | Cloudiest |

Sample 9 thus gave the best bulk physical properties of the three samples comparatively tested in this example, with low hydrolyzable chloride and acceptable extractables and viscosity. Compatibility appeared unchanged after one month.

The Sample 9 ultraviolet radiation cured MTQ hybrid resin had the following properties: 518 psi tensile shear strength, 154% elongation, 30 pli tear strength, 42 Shore A hardness, and uncured viscosity of 25,000 cps.

The MTQ/silicone hybrid resins of the present invention show greatly improved cured physical properties over unreinforced silicones and are comparable to commercially available MQ-reinforced formulations. Also, the bulk physical properties of such cured MTQ/silicone hybrid resins are much improved over silica-filled self-leveling formulations.

The optimum MTQ/silicone hybrid resins contain 35% by weight of a 1.2 meq methacrylate per gram MTQ resin, grafted onto an idealized monoacrylate 28,000 MW silanol-terminated linear silicone. Adding methanol after the MTQ capping step removed residual chlorosilyl groups capable of crosslinking, resulting in lower viscosity products with a shelf life exceeding one month.

EXAMPLE VI

In this example, a siloxane polymer was prepared in accordance with the procedure of Example 5 of Tolentino U.S. Pat. No. 4,568,566, with the exception that an amount of difunctional silane (D component) was employed which gave a number of D units equivalent to the number of repeating D monomer units in the linear silicone (molecular weight 28,000, RP48V3500 silicone fluid, Rhone-Poulenc S.A.) employed in Example II, representative of the instant invention. The following reactants were used:

15.46 g (0.062 moles)  methacryloxypropyltrimethoxysilane

-continued 142.34 g (0.10 moles)  dichlorodimethylsilane
23.57 g (0.217 moles)  chlorotrimethylsilane
0.76 g (0.004 moles)   acryloxypropyldimethylchlorosilane
44.51 g (0.262 moles)  silicon tetrachloride The above-listed silanes were added to a 500 ml 3-neck flask equipped with a thermometer and condenser. Dropwise addition of 50 g water at room temperature, allowing the hydrogen chloride to escape, followed by stirring for 2 hours resulted in an aqueous suspension that could not be dissolved in toluene, but rather was an insoluble granular precipitate that could not be purified.

The foregoing shows that applying the Tolentino teachings to provide a D-unit level which is equivalent of that of the linear silicone polymer chains employed in the MTQ/silicone hybrid resin of the present invention, does not yield a useful isolatable polymer composition, whereas the MTQ/silicone hybrid resin of the present invention, having an equivalent D unit "loading" (in the linear silicone polymer chains which are grafted to the MTQ moiety), is a useful self-leveling composition, e.g., for conformal coating and potting applications.

EXAMPLE VII

In this example a siloxane composition was prepared according to the procedure of Example 5 of Tolentino (U.S. Pat. No. 4,568,566) except that the level of D units was 25 mole percent, corresponding to the maximum allowable level taught by Tolentino. The same concentrations of reactants were used as employed in Example VI herein, except that 23.49 g (0.182 moles) of dichlorodimethylsilane were used. The procedure of Example VI herein was otherwise followed. The resulting product was a granular precipitate in the reaction mixture, which was insoluble in toluene and could not be purified. This granular precipitate was not a flowable, self-leveling silicone, as is the MTQ/silicone hybrid resin provided by the present invention.

This example clearly shows that the MDTQ product obtained by the synthesis method taught by Tolentino is wholly different from, and non-analogous to, the MTQ/silicone hybrid resins of the present invention.

While preferred embodiments of the invention have been disclosed in detail, it will be appreciated that other modifications, embodiments, and variations of the invention may be employed, and all such modifications, embodiments, and variations are to be regarded as being within the spirit and scope of the present invention.

What is claimed is:

1. A polysiloxane, comprising:
   (I) an MTQ moiety having a plurality of pendant hydroxy groups and comprising a multiplicity of monofunctional siloxane units (M),

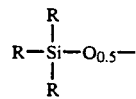

trifunctional siloxane units (T),

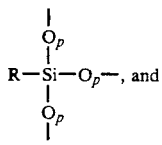

and tetrafunctional siloxane units (Q),

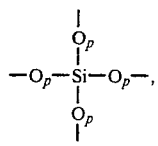

wherein:

p has a value of 0.5 when the associated oxygen atom is bonded to another silicon atom, and a value of 1 when the associated oxygen atom is bonded to other than a silicon atom, with the proviso that at least one p in each T and Q unit has a value of 0.5; each R is independently selected from the group consisting of alkyl, aryl, alkaryl, aralkyl, haloalkyl, (meth)acryloxyalkyl, and (meth)acryloxyalkenyl;

the concentration ratio of M units to the sum of T and Q units, M/(T+Q), in the MTQ moiety is from about 0.55 to about 0.75; and (II) covalently bonded to the MTQ moiety, a diorganosiloxane polymer of the formula:

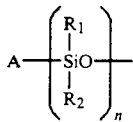

wherein:

A is an acrylic-functional end group;

$R_1$ and $R_2$ are each independently selected from the group consisting of alkyl, aryl, alkaryl, aralkyl, haloalkyl, (meth)acryloxyalkyl, and (meth)acryloxyalkenyl; and n is from 25 to 1000.

2. A polysiloxane according to claim 1, wherein A is selected from the group consisting of:

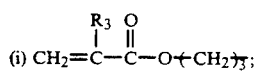

and (ii) (alkyl)acryloxyalkenyl selected from the group consisting of:

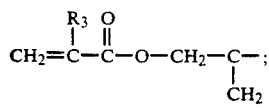

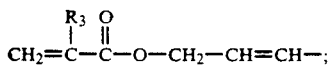

and isomeric mixtures thereof;

wherein $R_3$ is H or alkyl.

3. A polysiloxane according to claim 1, wherein n is from 100 to 1000.

4. A polysiloxane according to claim 1, comprising silanol groups in sufficient quantity relative to the number of acrylic functional groups present, to render the polysiloxane self-curable by exposure to UV radiation in the presence of a photoinitiator.

5. A UV curable composition comprising a polysiloxane according to claim 1 and a UV photoinitiator for said polysiloxane.

6. A curable composition according to claim 5, wherein said photoinitiator is alpha, alpha',diethoxyacetophenone.

7. A UV cured silicone composition formed by UV curing of the UV curable composition of claim 5.

8. A polysiloxane according to claim 1, wherein M/(T+Q) is from about 0.60 to about 0.70.

9. A polysiloxane according to claim 1, wherein M/(T+Q) is about 0.67.

10. A polysiloxane according to claim 1, wherein the MTQ moiety has a concentration of (meth)acrylic functionality of from about 0.60 to about 1.40 meq/gm solid.

11. A polysiloxane according to claim 1 wherein the diorganosiloxane polymer has a molecular weight of from 20,000 to 40,000.

12. A polysiloxane according to claim 1, wherein $R_1$ and $R_2$ are alkyl.

13. A polysiloxane according to claim 1, wherein $R_1$ and $R_2$ are methyl.

14. A polysiloxane according to claim 1, wherein the MTQ moiety contains no D siloxane units.

15. A graft MTQ/silicone resin formed by reacting (i) an MTQ moiety having pendant silanol functionality, with (ii) a linear diorganosiloxane polymer having (A) from 25 to 1000 diorganosiloxy repeating units, (B) an acrylic functional end group at one end of the linear diorganosiloxane polymer, and (C) a chlorosilane functional end group at a second end of the linear diorganosiloxane polymer, which is reactive with the pendant silanol functionality of the MTQ moiety to covalently bond the linear diorganosiloxane polymer to the MTQ moiety.

16. A method of making an MTQ/silicone hybrid resin, comprising the steps of:

(a) forming a linear polydiorganosiloxane having acrylic and chloro end groups, and comprising from 25 to 1,000 diorganosiloxy repeating units;

(b) hydrolyzing tetraalkyl orthosilicate, an acrylic-functional trialkoxysiloxane, and a chlorotrialkylsilane, to form an MTQ resin comprising silanol functionality; and (c) reacting chloro functionality of said linear polydiorganosiloxane with silanol functionality of said MTQ resin, to form an MTQ/silicone hybrid resin.

17. A method according to claim 16, wherein the MTQ resin contains no difunctional siloxane constituent.

18. A method according to claim 16, further comprising mixing the MTQ/silicone hybrid resin with methanol and heat aging the resulting mixture, to stabilize the viscosity thereof.

19. A method according to claim 16, comprising carrying out the hydrolysis for sufficient time to form an MTQ resin having a molecular weight of from about 1000 to about 10,000.

20. A method according to claim 16, wherein the mole ratio of M units to the sum of T units and Q units, M/(T+Q), in said MTQ/silicone hybrid resin is from about 0.55 to about 0.75.

21. A method according to claim 16, wherein said MTQ resin comprises (meth)acrylate functionality at a concentration of from about 0.28 meq/gram to about 2.54 meq/gram of said MTQ resin.

22. A method according to claim 16, wherein said MTQ resin comprises (meth)acrylate functionality at a concentration of from about 0.60 meq/gram to about 1.4 meq/gram of said MTQ resin.

23. A method according to claim 16, wherein said acrylic-functional trialkoxysilane is selected from the group consisting of acryloxypropenyltrimethoxysilane and methacryloxypropyltrimethoxysilane.

24. A method according to claim 16, wherein the reaction of said MTQ resin and said linear polydiorganosiloxane is carried out for sufficient time and under sufficient conditions to react a majority of hydroxyl functional groups of said MTQ resin.

25. A process of potting or conformally coating a substrate element, comprising:
    (1) mixing a polysiloxane according to claim 1 with an effective amount of UV photoinitiator to form a resulting UV curable composition;
    (2) applying said UV curable composition to said substrate element to pot or conformally coat said substrate; and
    (3) exposing the potted or coated substrate element to sufficient UV radiation to cure said UV curable composition.

26. A process according to claim 25, wherein said UV photoinitiator is alpha, alpha'-diethoxyacetophenone.

27. A potted or conformally coated article, comprising a substrate element potted or conformally coated with a cured composition according to the process of claim 25.

* * * * *